May 20, 1941. A. A. YOUNG 2,242,637
ELECTRIC METER TROUGH COVER AND SOCKET RING THEREFOR
Filed Sept. 7, 1939 2 Sheets-Sheet 1
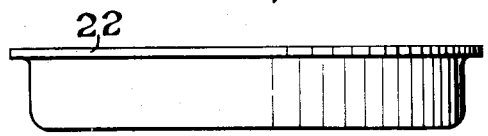
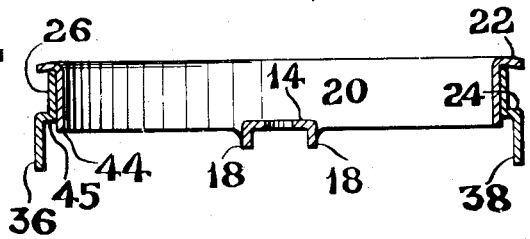
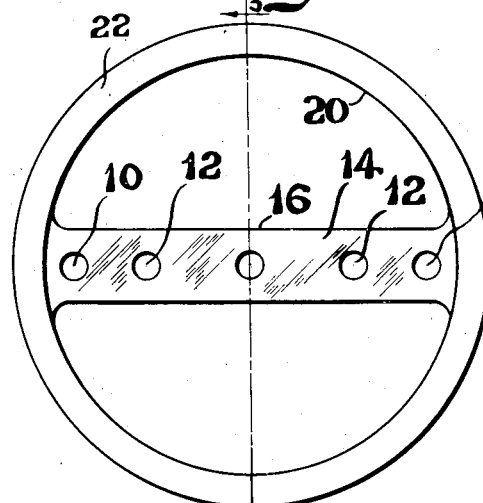
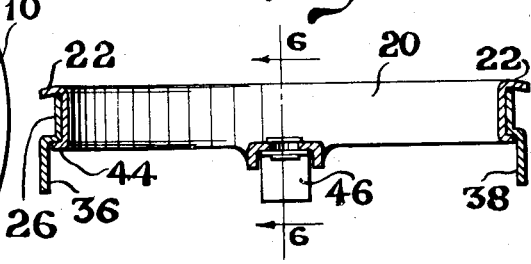
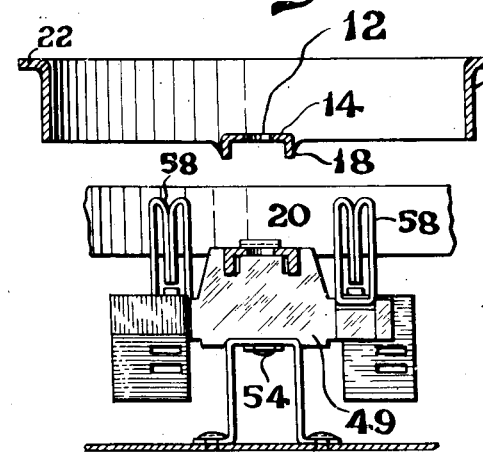
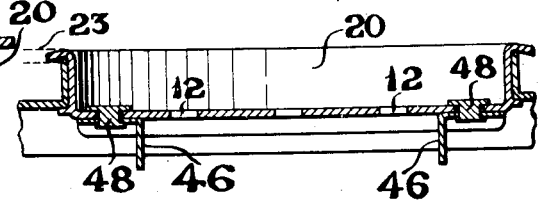
INVENTOR
ARTHUR A. YOUNG
BY
*Louis Necho*
ATTORNEY

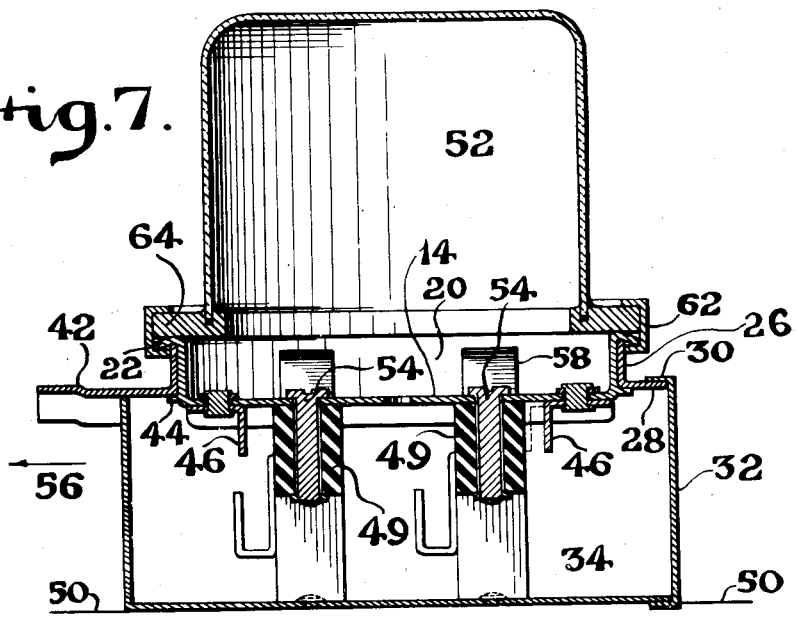
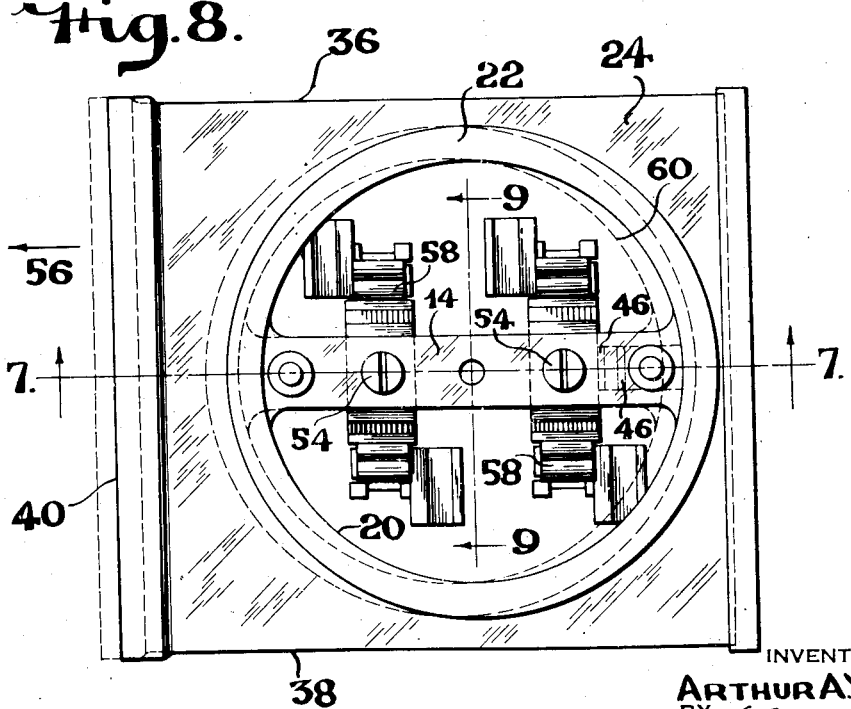

Patented May 20, 1941

2,242,637

UNITED STATES PATENT OFFICE 2,242,637

ELECTRIC METER TROUGH COVER AND SOCKET RING THEREFOR

Arthur A. Young, Manchester, N. H., assignor to Anchor Manufacturing Co., Boston, Mass., a corporation of Massachusetts Application September 7, 1939, Serial No. 293,742

10 Claims. (Cl. 175—220)

Electric meter installations comprise, generally speaking, a trough adapted to be secured to the wall or other support, and housing the service and load busses and clips and a meter for measuring the flow of electrical energy, the meter having terminals adapted to engage said load and service clips. This invention relates to an improvement in the trough of a meter installation and more particularly to the trough of a "socket" or "back-connected" type of electric meter installation.

One relatively early form of this type of trough was provided with a detachable cover having a circular opening therein and a separate ring secured to the cover and registering with said opening. This ring, which is known as a socket ring, was provided with legs or extensions projecting into the trough and adapted to be secured to the terminal block within a trough. The cover in turn was secured to the trough with bolts or the like. A sealing band was then used to engage the socket ring and a ring formed at the base of the meter, and which is known as the meter ring, to prevent shunting or other unauthorized tampering with, or removal of the meter, the back terminals of which engage the energized clips within said trough.

As an improvement on this construction, it has been proposed to use a trough cover having the same circular opening therein and a die-cast socket ring registering with said opening and suitably secured to the cover, said die-cast socket ring having, at its base, an integral, diametrically disposed cross bar adapted to straddle and be screwed, bolted, or otherwise fastened to the terminal block for securing the cover to the trough. The cross bar referred to eliminated the legs or inwardly projecting extensions used in the first mentioned construction.

Another improvement consisted in the use of the integral, die-cast socket ring and securing cross bar referred to, in connection with a trough cover having the same circular opening but having an integral, annular flange drawn or extruded from the cover at right angles to the plane of, and surrounding the opening, with the die-cast socket ring disposed on the outside of and engaging said annular flange. This construction is not weatherproof and is relatively expensive.

It is therefore an object of my invention to improve on the constructions above described and to that end my invention consists in combining a drawn socket ring and securing bar with a trough cover having an extruded collar cooperating with said ring whereby a light, durable, efficient, inexpensive and weather-proof construction is produced.

Furthermore, in the conventional constructions hereinabove described there was always the danger of short circuiting the load and service clips within the trough when the trough cover and socket ring were being removed, thus causing serious property and personal damage. In the case of a wall installation, for instance, (with the axis of the meter lying in a horizontal plane) the operator, after disconnecting the sealing band and removing the meter, must disconnect the screws or bolts securing the cross bar of the socket ring to the terminal block within the trough before the trough cover can be removed. When the last fastening screw or bolt is removed, the socket ring and the trough cover are apt to slide downwardly so that the socket ring touches one or more of the energized clips or terminals on the corresponding side of the trough, thus short circuiting the service and causing serious damage and injury. Even if the trough cover and socket ring did not accidentally slide into contact with the energized clips, there was an ever present danger that the operator, in removing the cover and socket ring from the trough, might miscalculate and thus allow the socket ring to come in contact with the energized clips.

My invention therefore further contemplates the provision of means applicable to my present invention, as well as to other forms of this construction, positively to prevent the socket ring and cover from coming into contact with the energized terminals of the trough and thus eliminating all risk of damage or injury due to short circuiting of the energized terminals.

The supporting frame of the electric mechanism contained within and operating an electric meter can only be practically and effectively grounded through good conductive connection with the cover of the meter trough and to that end meter trough covers, together with their socket rings, were made of steel or other ferrous metals which, as is well known, are subject to excessive rust or corrosion. While rust and corrosion on the trough cover proper are not desirable, they are nevertheless not critically objectionable, but it is necessary that the socket ring itself be rust and corrosion proof and, at the same time, it must possess the desired degree of electrical conductivity. To solve this problem it has been proposed to make the trough cover and the socket ring of one piece of electrically conducting but rust and corrosion resisting metal by drawing and extrusion but this method has been found in practice to possess many disadvantages from the standpoint of practical manufacturing considerations, especially if the finished article is to conform to standard requirements.

It is therefore a further object of my invention to provide a novel construction produced according to a novel method by means of which the socket ring which is in contact with the meter ring is made of a rust-proof and non-corrosive metal while the trough cover proper can be made of steel or other ferrous metals whereby effective grounding of the meter to the socket ring is attained in a practical, efficient and inexpensive manner.

In the interest of mass production it is necessary that the trough cover and socket ring be so made as to lend themselves to easy, automatic but nevertheless perfect, concentric and longitudinal alignment with the trough and the terminal block in the trough and to that end my invention contemplates a construction which overcomes this difficulty in a manner which will hereinafter be more fully set forth.

My invention will be more clearly understood from the following specification and the accompanying drawings in which:

Fig. 1 represents in side elevation a view showing the first step in the manufacture of a drawn ring embodying my invention.

Fig. 2 represents a top plan view of Fig. 1 showing the second step in the making of the drawn ring shown in Fig. 1.

Fig. 3 represents a section on line 3—3 of Fig. 1.

Fig. 4 represents the third step in the making of the ring and the first step in its application to the cover of a meter trough.

Fig. 5 represents the fourth and last step of the application of the drawn ring to a trough cover, the ring being provided with guards for preventing accidental contact of the ring or cover with the energized terminals of the meter while the ring and the cover are being removed.

Fig. 6 represents a section on line 6—6 of Fig. 5.

Fig. 7 represents diagrammatically and in vertical section a view of a meter trough having a cover and ring embodying my invention and showing a back-connected meter in position, certain parts being omitted.

Fig. 8 represents a top plan view of Fig. 7 with the meter proper removed.

Fig. 9 represents a fragmentary, sectional view on line 9—9 of Fig. 8 showing details of construction.

Referring to the drawings in which like reference characters indicate like parts, and taking up first the method of fabrication, I take a piece of sheet metal, cut circularly and of the desired thickness, and I draw the flat sheet into the form of a dish, as shown in Fig. 1, having a flange 22 extending horizontally from the upper rim thereof. Next, I punch the holes 10 and 12 and cut out the bottom of the dish except for a diametrically disposed cross bar 14. The device now appears as shown in Fig. 2. The edges 16 of the cross bar 14 are turned downwardly to form the flanges 18 which give the cross bar 14 a channel-shaped cross section as best seen in Figs. 3, 4 and 5. The device is now in the form of a ring 20 having the integral cross bar 14 and flange 22 as shown in Fig. 3.

I next apply the ring 20 (as shown in Fig. 4) to a trough cover 24 which is preferably of a flat sheet having a circular opening therein and an integral drawn or extruded collar 26. If the trough is a single installation, one edge of the cover 24 is inserted under the inwardly turned flange 30 formed on the wall 32 of the trough 34 and the other three edges 36, 38 and 40 are turned down to overlap the vertical edges of the corresponding walls of the trough 34. If the trough is a part of a multiple installation then the edge 40 of the cover 24 is not deflected downwardly, as are the edges 36 and 38 but is formed with a slight offset as shown at 42, so as to be inserted under the edge of the cover of the contiguous or next adjacent trough which would be to the left in Figs. 7 and 8. This is only described to clarify the construction but it forms no part of the invention. The lower edge 44 of the ring 20 is now turned outwardly to engage the annular shoulder 45 formed in the cover immediately below and around the collar 26 and the device will now appear as shown in Fig. 5. It will be noted that the height of the ring 20 is greater than the height of the collar 26 by an amount sufficient to permit of the drawing of the upper flange 22 and the lower flange 44 so that the collar 26 is tightly held between the upper and lower flanges 22 and 44. It will also be noted that, circumferentially speaking, the collar 26 has an internal diameter barely large enough to permit the ring 20 to be forced thereinto so that a tight fit results between the contiguous walls of the outer collar 26 and the inner ring 20. The insertion of the ring 20 within the collar 26 produces a completely weatherproof connection since the collar 26 is integral with the cover 24 and hence presents no seam which would permit seepage or moisture to the inside of the trough 34. The turning out of the flanges 22 and 44, together with the snug fit of the collar 26 therebetween, as well as the snug fit of the ring 20 within the collar 26, forms a construction which to all practical purposes is the same as if the ring 20 were integral with the cover 24, except that due to the combined thickness of the juxtaposed ring 20 and collar 26 the construction is greatly reinforced.

As best seen in Fig. 6, an angle iron 46 is then suitably secured as at 48 to the underside of the cross bar 14 at one or both of the end holes 10 and in registration with the insulated terminal blocks 49 as best seen in Fig. 7. Assuming that the complete installation illustrated in Fig. 7 is secured in a vertical position to a wall 50, and assuming that the meter proper 52 has been removed, it will be seen that in order to remove the cover 24 from the trough 34 the fastening screws 54 which engage the openings 12 of the cross bar 14 must first be removed and the cover 24 is then moved at right angles to the axis of the meter or in the direction of the arrow 56. Unless the operator is extremely careful the ring 20, when the screws 54 have been removed, will tend to slide downwardly in the direction of the arrow 56 and if the ring 20 should come in contact with one or more of the service clips 58 there will be a short circuit with personal injuries which may be fatal and property injuries which may be extensive. By the provision of the guard 46 it will be seen that if the cover 24 and ring 20 should slide accidentally in the direction of the arrow 56 the guard 46 will assume the position shown in dotted lines in Fig. 7, and in which it abuts against the insulated block 49. This prevents the ring 20 or any associated part from coming in contact with the energized clips 58. In Fig. 8 the ring is shown in the normal position in solid lines and is shown in dotted lines at 60 in the extreme position to which it could move in the direction of the arrow 56 where it is prevented from contact with the energized clips 58 by the guard 46 abutting against the insulated block 49. In the absence of the guard 46 there is nothing to limit the movement of the ring 20 in the direction of the arrow 56 so that the ring 20 will only be prevented from contacting the energized clips 58 by the skill and care of the operator which is not always a positive element. Referring again to the upper flange 22 of the ring 20 it will be seen that it is made sufficiently large as to project beyond the vertical plane of the collar 26 so that it may accommodate the conventional sealing band 62 which, as best seen in Fig. 7, engages the flange 22 as well as the upper edge of the meter ring 64 to secure the meter in position.

From the foregoing it will be seen that, if the entire trough cover and socket ring were to be drawn of one piece of metal, the collar 26 would have to be made of the depth of the ring 20 so as to allow the upper edge of the collar 26 to be turned outwardly to form a flange to take the place of the flange 22 of the ring 20. This is difficult and requires a high grade of drawing metal to avoid cracks in the outer edge of the flange. Furthermore, the making of the entire cover and socket ring of non-rusting metal will add to the cost unnecessarily. By my invention the socket ring 20 being made of a very ductile non-rusting metal is applied to the cover 24 which may be made of ordinary steel or the like thus cutting the cost of the material, and the extrusion of the cover 24 and collar 26 is a relatively simple matter which does not place any undue strain on the metal and the same is true of the extrusion of the ring 20.

Since the cross bar 14 must align with perfect accuracy with corresponding holes in the terminal block 49 so as to receive the fastening screws 54, it follows that, where the socket ring and the cover are made integral, it is necessary to align the cross bar 14 with respect to the cover and integral socket ring, concentrically speaking, and it is also necessary to align the cross bar 14, transversely and longitudinally speaking, with respect to the terminal block 49 and the holes for receiving the fastening screws. In other words, the cross bar 14 has to be located exactly centrally of the socket ring integral on the cover, and the longitudinal edges 16 of the bar 14 must be exactly parallel to the corresponding edges of the trough. Also, the holes 10 and 12 in the cross bar 14 must be punched with accuracy with reference to the corresponding holes in the terminal block, both with respect to the spacing of the holes one from another, and also with respect to the fastening of the cross bar 14 to the integral trough cover and socket ring. Thus, if the cross bar 14 has accurately punched holes 10 and 12 and is centered with respect to the socket ring, but is, when applied to the cover, slightly off longitudinally speaking, it will be found that the holes 12 in the bar 14 will not register with the corresponding holes in the terminal block 49. This obviously adds to the expense of manufacture and assembly. According to my invention, where the cross bar 14 is integral with the ring 20 and is, indeed, formed, together with the holes 10 and 12, by means of one continuous operation, the bar 14 will have perfect, predetermined, concentric and longitudinal or diametric alignment with respect to the socket ring, and it is merely necessary properly to align the socket ring 20 with respect to the cover 24 before the ring 20 is inserted into the collar 26 and its upper and lower flanges 22 and 44 are turned as shown in Fig. 5. In case of manual operation an index mark can be provided on the ring and the cover, but, inasmuch as the forcing of the ring 20 within the collar 26 is done by a power press, an aligning die having spaced pins which engage the holes in the cross bar 14 is used and this insures perfect alignment of the ring 20 and its integral bar 14 with respect to the collar 26 and cover 24.

Also, since the drawn or extruded ring 20 is necessarily thinner than the die-cast ring and in order to compensate for this, the extruded flange 22 is deflected or humped as shown by comparison with the horizontal dotted lines 23 in Fig. 6, so that when the conventional sealing band 62 is applied to the flange 22 and the meter ring 64, the distance between the uppermost and lowermost points of the flange 22 will equal the thickness of the flange of a standard die-cast ring, thus producing a tight fit and enabling the sealing band 62 tightly to clamp the meter in position with respect to the trough. This insures perfect and constant contact of the terminals of the meter with the terminals in the trough.

Due to the fact that the cross bar 14 is integral with the ring 20 and since the screws 54, which engage the cross bar, also engage the conventional, threaded, conducting elements (not shown) which are in turn securely grounded to the base, it follows that the meter casing is more effectively grounded than if the cross bar 14 were a separate element secured to the ring. Since the ferrous cover 24 is usually painted to prevent rust, and since regardless of painting there is no effective conductive bond between the cover and the trough, the cover 24 can not be depended on to ground the meter casing, whereas the rust-proof socket ring 20 and integral bar 14 can be depended on for effective and complete grounding.

From the foregoing it will be seen that by my invention a drawn cover formed of inexpensive ferrous metal is used with the collar 26 extruded therefrom and that the socket ring 20 is tightly forced thereinto. Also the turning of the flange 44 further tightens the engagement between the ring 20 and cover 24 so that they are, for practical purposes, integral. Also by my novel method of drawing and extruding the cover 24 and collar 26 on the one hand, the socket ring 20 and its cross bar 14 on the other, and assembling them as above set forth, I am enabled to make the cover 24 and ring 20 of different metals and to produce a most practical, efficient and comparatively inexpensive construction.

While I have shown a plurality of screws 54 for connecting the cross bar 14 to the terminal block, it is to be understood that one screw will be enough for the purpose. Also, while I have shown the cross bar 14 as extending clear across the ring 20 and interconnecting the bottom edges thereof as best seen in Figs. 2 and 6 it is within the scope of my invention if desired to cut out the middle portion of the cross bar 14 so as to leave only two legs extending inwardly from the wall of the ring 20 enough to accommodate one or more openings 12 for fastening to the terminal block and one or more of the openings 10 for securing the guard 46.

By my construction the strain or pull due to the weight of the meter which is mounted horizontally with respect to the plane of the cover 24 is transmitted to the back of the trough without being concentrated at the point or points at which a separable cross bar 14 would be secured to the cover.

Having thus described my invention, what I claim as new and desire to secure by Letters Patent is:

1. The combination with an electric meter trough of a cover having an opening therein for accommodating an electric meter, and an integral drawn collar surrounding said opening, said cover and said collar being formed of ferrous sheet metal, and a drawn socket ring fitting within said opening and formed of a non-ferrous non-rusting and non-corroding metal of relatively high electric conductivity.

2. The combination with a cover of an electric meter trough having an opening therein for accommodating an electric meter, of a drawn socket ring comprising an annular member adapted to fit within said opening, an integral cross bar extending diametrically across said annular member, and a flange turned outwardly from one edge of said socket ring.

3. The combination with an electric trough of a cover for said trough having an opening therein for accommodating an electric meter and an integral collar extending substantially at right angles to said cover and surrounding said opening, a socket ring coacting with said cover comprising an annular member tightly fitting within said collar, and a cross bar integral with and extending across the bottom edge of said annular member and adapted to be secured to the terminal block within said trough, a flange turned outwardly from the lower edge of said annular member and adapted to engage the underside of the contiguous edge of said cover and a flange turned outwardly from the upper edge of said annular member and adapted to be engaged by a sealing band which also engages a ring on a meter mounted in said trough.

4. The combination with the cover of an electric meter trough having an insulating block mounted therein, of a safety device carried by the underside of said cover and adapted laterally to abut against said insulating block, to prevent said cover from accidentally coming into contact with the energized terminals carried by said block, when said cover is being removed from said trough.

5. The combination with an electric meter trough including a cover for said trough and a socket ring secured to said cover, of a safety guard carried by said ring at a point spaced inwardly from the periphery of said ring, said safety guard being adapted to abut against the insulated block which supports the energized terminals within said trough to prevent said socket ring from coming in contact with any of the energized terminals during relative movement of said cover with respect to said trough.

6. The combination with the socket ring of the trough of a back-connected electric meter, of a pendant stop carried by the cross bar extending across the bottom of said socket ring, said stop being adapted to abut against the insulating block in said trough to prevent said ring from coming into contact with the energized terminals on said block due to lateral movement of said ring with respect to said trough.

7. A cover for the trough of a back-connected electric meter comprising a body portion adapted to extend over the opening of said trough, said body portion having an annular opening therein, a socket ring fitted over said opening, a diametrically disposed cross bar extending across the bottom edge of said socket ring and a stop carried by said cross bar in inwardly spaced relation from said ring, said stop being adapted to abut against the insulating block in said trough to prevent said socket ring from coming in contact with the energized terminals in said trough when said ring is moved relative to said trough.

8. As an article of manufacture, a socket ring for an electric meter installation comprising, integrally drawn annular member and cross bar, and flanges turned outwardly from the opposite edges of said annular member.

9. As an article of manufacture, a socket ring for an electric meter installation comprising, integrally drawn annular member and cross bar, and flanges projecting outwardly from the opposite edges of said annular member.

10. The combination with a cover of an electric meter trough having an opening therein for accommodating an electric meter, of a drawn socket ring comprising an annular member adapted to fit within said opening, an integral cross bar extending diametrically across said annular member, and a flange projecting outwardly from one edge of said socket ring.

ARTHUR A. YOUNG.